(12) United States Patent
Baxter, Jr.

(10) Patent No.: US 8,791,216 B2
(45) Date of Patent: Jul. 29, 2014

(54) ACTIVATED INORGANIC METAL OXIDES

(75) Inventor: C. Edward Baxter, Jr., League City, TX (US)

(73) Assignee: Petrochemical Supply, Inc., Houston, TX (US)

( * ) Notice: Subject to any disclaimer, the term of this patent is extended or adjusted under 35 U.S.C. 154(b) by 0 days.

(21) Appl. No.: 13/500,956

(22) PCT Filed: Mar. 9, 2011

(86) PCT No.: PCT/US2011/027769
§ 371 (c)(1),
(2), (4) Date: May 22, 2012

(87) PCT Pub. No.: WO2011/112729
PCT Pub. Date: Sep. 15, 2011

(65) Prior Publication Data
US 2012/0238716 A1    Sep. 20, 2012

Related U.S. Application Data

(60) Provisional application No. 61/312,869, filed on Mar. 11, 2010.

(51) Int. Cl.
C08F 2/00    (2006.01)
C08F 4/00    (2006.01)
C08F 10/00    (2006.01)
B01J 31/00    (2006.01)
C08F 10/10    (2006.01)
B01J 21/02    (2006.01)
C08F 110/10    (2006.01)

(52) U.S. Cl.
CPC ............... B01J 21/02 (2013.01); C08F 110/10 (2013.01); C08F 10/10 (2013.01)
USPC ............. 526/69; 526/210; 526/237; 526/290; 502/172

(58) Field of Classification Search
USPC ................... 526/69, 210, 237, 290; 502/172
See application file for complete search history.

(56) References Cited

U.S. PATENT DOCUMENTS 4,629,766 A    12/1986    Malatesta et al.
6,479,598 B1 *    11/2002    Lewtas et al. .................. 526/69
2009/0023882 A1 *    1/2009    Hanefeld et al. ........... 526/348.7

OTHER PUBLICATIONS

International Search Report for corresponding International Application No. PCT/US11/27769.

* cited by examiner

*Primary Examiner* — William Cheung
(74) *Attorney, Agent, or Firm* — Egbert Law Offices, PLLC

(57) ABSTRACT

A catalyst system for heterogeneous catalysis of organic compound conversion reactions is disclosed. The system includes a reaction product of (i) a $BF_3$/alcohol catalyst complex and (ii) an activated metal oxide support for the catalyst complex. The reaction product includes an amount of the catalyst complex effective for catalyzing the conversion reaction.

8 Claims, No Drawings

ACTIVATED INORGANIC METAL OXIDES

CROSS REFERENCE TO RELATED APPLICATION

This application is based on and claims priority under 35 U.S.C. §119(e) from presently U.S. provisional application Ser. No. 61/312,869, filed Mar. 11, 2010, the entirety of the disclosure of which is hereby incorporated by reference.

FIELD OF THE INVENTION

The invention of the present application relates to catalysts used in organic compound conversion reactions. More particularly, the invention relates to an activated metal oxide catalyst used in organic compound conversion reactions.

BACKGROUND OF THE INVENTION

A great number of different types of catalyst systems have been proposed in the past for conducting organic compound conversion reactions. These systems include the use of such things as (1) Metal Oxide $BF_3$ Complexes, (2) $BF_3$ and Liquid $BF_3$ Complexes as Catalysts for Isobutylene Polymerization, (3) Liquid $BF_3$ Methanol Complexes as Isobutylene Polymerization Catalysts, and (4) Solid Isobutylene Polymerization Catalysts. Prior art relevant to these prior art systems is discussed below.

Metal Oxide $BF_3$ Complexes

Inorganic metal oxides, such as alumina, have been provided with catalytic activity in the past by contacting the same with $BF_3$, usually in gaseous form. The contacting is usually followed by hydrolysis and calcination or some other post-treatment. These catalysts generally have limited activity, are not stable and release free $BF_3$ into the reaction products requiring post reaction removal of these residues.

U.S. Pat. No. 2,804,411, assigned to American Oil Company, discloses treatment of a Si stabilized gelled alumina with gaseous $BF_3$. Free $BF_3$ is required to be added to the reaction mixture.

U.S. Pat. No. 2,976,338, assigned to Esso, describes an olefin polymerization catalyst comprising a $BF_3.H_3PO_4$ complex that may be absorbed onto a solid support.

U.S. Pat. No. 3,114,785, assigned to UOP, describes an olefin isomerization catalyst made by contacting anhydrous gamma or theta alumina with gaseous $BF_3$ at temperatures from about 100° C. to 150° C. for 10 hours or until alumina is saturated. The process of olefin isomerization using the $BF_3$-alumina catalyst is claimed; the composition of the catalyst is not claimed.

U.S. Pat. No. 4,407,731, assigned to UOP, claims catalytic compositions of matter prepared by pre-treating a metal oxide, such as alumina, with aqueous acid and base followed by calcination. The treated gamma alumina is then treated with $BF_3$ gas at temperatures of 308-348° C. at elevated pressure to obtain the final catalyst useful for oligomerization and alkylation reactions.

U.S. Pat. No. 4,427,791, assigned to Mobil Oil Co., discloses a method for enhancing the activity of metal oxides, such as alumina, by treating the alumina with $NH_4F$ or $BF_3$, contacting this fluoride containing product with an ammonium exchange solution and then calcinating the final product.

U.S. Pat. No. 4,918,255, assigned to Mobil Oil Co., describes an isoparaffin alkylation catalyst based on metal oxides and aluminosilicate zeolites treated with a Lewis acid, including $BF_3$, in the presence of a controlled amount of water or water-producing material. Excess $BF_3$, to that needed to saturate the metal oxide, is used requiring post reaction $BF_3$ removal.

U.S. Pat. No. 4,935,577, assigned to Mobil Oil Co., describes a catalytic distillation process using a non-zeolite metal oxide activated with $BF_3$ gas. Excess $BF_3$, above that needed to saturate the metal oxide is used requiring post reaction $BF_3$ removal.

$BF_3$ and Liquid $BF_3$ Complexes as Catalysts for Isobutylene Polymerization The homogenous catalytic polymerization of olefins using gaseous $BF_3$ and liquid BF3 complexes is well known. The polymers generally so produced are of the highly reactive type wherein a large percentage of the polymer contains terminal double bonds or has a high vinylidene content. All of these processes require post-reaction removal of the $BF_3$ catalyst.

U.S. Pat. No. 4,152,499, issued to Boerzel et al., describes the synthesis of polyisobutylene having a degree of polymerization of 10-100 units using a blanket of $BF_3$ gas as the catalyst. The polyisobutylene product was then reacted with maleic anhydride in yields of 60-90% indicating a large portion of vinylidene end groups.

U.S. Pat. No. 4,605,808, issued to Samson, describes production of a polyisobutylene having at least 70% unsaturation in the terminal position. An alcohol complex of $BF_3$ was used as the catalyst. Complexing the $BF_3$ seems to give better control of the reaction and higher vinylidene content.

U.S. Pat. No. 7,411,104, assigned to Daelim Industrial Co., describes a method for producing highly reactive polyisobutylene from a raffinate-1 stream using a liquid $BF_3$ secondary alkyl ether-tertiary alcohol complex. The process requires low reaction temperatures and the catalyst complex is not stable and must be made in situ. The catalyst must be removed from the reactor effluent by a post reaction treatment process.

U.S. Pat. No. 5,191,044, issued to Rath et al., discloses a process for preparing polyisobutylene in which the $BF_3$ catalyst is completely complexed with an alcohol such that there is no free $BF_3$ in the reactor or in the reaction zones. An excess of alcohol complexing agent is required to assure that no free $BF_3$ is present. The reaction times are on the order of 10 minutes with reaction temperatures of below 0° C.

Rath, in U.S. Pat. No. 5,408,018 describes a multistage process for preparing highly reactive polyisobutene with a content of terminal vinylidene groups of more than 80 mol % and an average molecular weight of 500-5000 Dalton by the cationic polymerization of isobutene or isobutene-containing hydrocarbon feeds in liquid phase with the aid of boron trifluoride as catalyst and at from 0° C. to −60° C. comprises polymerizing in the presence of secondary alcohols with 3-20 carbon atoms and/or ethers with 2-20 carbon atoms.

Olefin polymerization, especially isobutylene polymerization, is an exothermic process. Control of reaction temperature is critical to product quality, catalyst life, degree of polymerization and obtaining the desired pre-selected properties. In the patents cited above, the reaction temperature was controlled by dilute olefin monomer concentration, complexed catalyst, multi-stage reactions and/or long reaction times and low reaction temperatures. Low reaction temperatures increase energy requirements; long reaction times or dilute feed streams increase equipment size and equipment cost (capital expenditures).

Liquid BF$_3$ Methanol Complexes as Isobutylene Polymerization Catalysts

U.S. Pat. Nos. 6,525,149, 6,562,913, 6,683,138, 6,884,858 and 6,992,152, to Baxter, et al. al, describe an olefin polymerization process in which the polymerization is carried out in the tube side of a heat exchanger under turbulent flow conditions. The reactor design allows for very effective and efficient removal of the heat of reaction such that relatively high feed rates and concentrated feed streams may be used. BF$_3$-methanol complex is used as the catalyst and because this complex is particularly stable, higher reaction temperatures may be used. The BF$_3$-methanol catalyst complex may be preformed, formed in-situ by separate injection of the methanol complexing agent, or a combination of both.

The BF$_3$ methanol complexes are very stable allowing for higher isobutylene polymerization temperatures not possible with other BF$_3$ oxygenate complexes, particularly higher alcohols, secondary alcohols, ethers and the like. Also, because higher reaction temperatures may be used, reaction rates are increased.

However, in all of the patents cited above, the BF$_3$, or at least portions of the BF$_3$, catalyst are soluble in the polymer products. Residual BF$_3$ is detrimental to product quality and must be removed as quickly as possible. Hence, these processes must employ some kind of catalyst quench and catalyst removal steps subsequent to the reaction. The quenched BF$_3$ streams cannot be recycled and the BF$_3$ is lost.

Solid Isobutylene Polymerization Catalysts

Isobutylene and butylene polymerizations have also been conducted using solid catalysts, particularly Friedel-Crafts type catalysts such as AlCl$_3$. The advantage to these processes is that the catalyst is a solid and is not soluble in the product. Catalyst removal and product purification is much easier than in the BF$_3$ catalyzed reactions U.S. Pat. No. 2,484,384, assigned to California Research Corporation, U.S. Pat. No. 2,677,002, assigned to Standard Oil Co., U.S. Pat. No. 2,957,930, assigned to Cosden Petroleum Corporation and U.S. Pat. No. 3,119,884, assigned to Cosden Petroleum Corporation, all describe AlCl$_3$ catalyzed butylene polymerization processes using a fluidized bed reactor system.

U.S. Pat. No. 4,306,105, assigned to Cosden Petroleum Corporation, describes a chlorinated alumina catalyst prepared by reacting pure alumina with pure chlorine. A fluidized bed reactor is utilized for butene polymerization.

Solid catalysts have also been used to produce olefin polymers with a high proportion of terminal vinylidene groups.

U.S. Pat. No. 5,710,225, assigned to Lubrizol, claims the use of phosphotungstic acid salt to polymerize $C_2$-$C_{30}$ olefins to produce polymers with molecular weights in the range of 300-20,000. The use of phosphotungstic catalyst, in a fixed bed reactor, is also described, but the flow rate is low and is generally operated as a plug flow reactor. The resulting polymer has an undesirable very high polydispersity. The fixed bed reactor as described in the example would not be economically feasible.

U.S. Pat. No. 5,770,539, assigned to Exxon Chemical Patents, Inc., discloses heterogeneous Lewis acids polymerization catalysts, such as BF$_3$, immobilized in porous polymer substrates. The BF$_3$ is complexed with the aromatic rings of cross-linked polystyrene copolymers.

U.S. Pat. No. 5,874,380, assigned to Exxon Chemical Patents, Inc., claims a solid state insoluble salt catalyst system for the carbocationic polymerization of olefin monomer in the presence of polar or non-polar reaction medium which comprises at least one salt of a strong acid and a carbocationically active transition metal catalyst selected from Groups IIIA, IVA, VA, and VIA of the Periodic Table of the Elements.

U.S. Pat. No. 6,384,154, assigned to BASF Aktiengesellshaft, discloses a process for preparing halogen free, reactive polyisobutylene by cationic polymerization over an acidic, halogen free heterogeneous catalyst comprising oxides and elements from transition or main group I, II, III, IV, V, VI, VII or VIII of the Periodic Table of the Elements. The polymerization is carried out in a fixed bed reactor.

The solid, heterogeneous butylene polymerization catalysts cited above do solve the problem of catalyst residues in the reactor effluent, thereby eliminating the need for post reaction treatment. However, conversions are low, space velocities are low and reaction temperatures are low.

BF$_3$ activated metal oxides are not described in the prior art as polymerization catalysts for the manufacture of polybutene or polyisobutylene. In fact, U.S. Pat. No. 6,710,140 assigned to BASF Aktiengesellshaft, claims the use of alumina as a solid deactivator to absorb BF$_3$ catalyst residues from polyisobutylene reactor effluents. The resulting BF$_3$-alumina complex is described to be not catalytic.

SUMMARY OF THE INVENTION

In accordance with the concepts and principles of the invention of the present application, a process is provided for preparing an improved catalyst system which may be used in connection with acid catalyzed organic compound conversion reactions. This catalyst system desirably comprises a BF$_3$/alcohol-metal oxide reaction product having increased activity over catalyst compositions obtained using other processes and methods. The BF$_3$/alcohol-metal oxide reaction products of the invention are stable at operating conditions and the organic conversion products made using these catalyst systems do not contain catalyst residues and are free from boron and fluorine residues. Because the conversion products do not contain catalyst residues, post reaction catalyst removal is not required. Thus, heterogeneous production processes are greatly simplified through the use of the catalyst systems of the invention of the present application.

The catalyst systems of the invention are particularly applicable to the heterogeneous catalytic polymerization of isobutylene in isobutylene containing streams to thereby produce polyisobutylenes, and even more particularly, highly reactive polyisobutylenes (HR PIB).

The catalyst systems of the invention are particularly well suited for use in connection with the conduct of acid catalyzed reactions such as dimerization and oligomerization of olefins.

In accordance with the concepts and principles of the invention, a highly stable catalyst system is provided for heterogeneous catalysis of organic compound conversion reactions. The system may desirably include a reaction product of (i) a BF$_3$/alcohol catalyst complex and (ii) an activated metal oxide support for the catalyst complex. The reaction product, which may be referred to as a BF$_3$/alcohol-metal oxide system, includes an amount of the catalyst complex effective for catalyzing conversion reactions. In particular, the catalyst system of the invention is useful in connection with conversion reactions such as Friedel-Crafts alkylation, phenolic alkylation, olefin dimerization, olefin oligomerization, olefin polymerization, propylene oligomerization, propylene polymerization, butylene dimerization, butylene oligomerization, isobutylene dimerization, isobutylene oligomerization, butylene polymerization, isobutylene polymerization or isoparaffin alkylation. The catalyst systems of the invention are highly stable and are generally not consumed during the reaction. That is to say, the catalyst systems of the invention do not require regeneration. Moreover, when the catalyst systems of the invention are used in the form of a fixed bed, there is generally no need for treatment of the product for removal of catalyst residues.

Preferably, the alcohol of the catalyst system has no alpha hydrogen. Even more preferably the alcohol may comprise a $C_1$-$C_{10}$ monohydric alcohol, glycol or polyhydric alcohol. Ideally the alcohol may be methanol.

Preferably the concentration of the catalyst complex on the alumina may range from about 10 to about 30% by weight. Ideally the concentration of the catalyst complex on the alumina may range from about 25 to about 30% by weight.

In a preferred embodiment of the invention, the catalyst system may be used in the form of a fixed bed, the activated metal oxide support may comprise gamma alumina, and the conversion reaction may comprise polymerization of isobutylene to form a polyisobutylene product.

Desirably the ratio of alcohol to $BF_3$ in the catalyst complex may range from about 0.5 mole of alcohol per mole of $BF_3$ to about 2 moles of alcohol per mole of $BF_3$. Ideally the ratio of alcohol to $BF_3$ in the catalyst complex may range from about 1 mole of alcohol per mole of $BF_3$ to about 1.3 moles of alcohol per mole of $BF_3$.

In a highly preferred embodiment of the invention, a catalyst system is provided for the heterogeneous catalysis of an isobutylene polymerization reaction and the system comprises a reaction product of (i) a $BF_3$/methanol catalyst complex and (ii) a gamma alumina support for said catalyst complex In this highly preferred form of the invention, the ratio of alcohol to $BF_3$ in the catalyst complex may range from about 0.5 mole of alcohol per mole of $BF_3$ to about 2 moles of alcohol per mole of $BF_3$, and the concentration of the catalyst complex on the alumina may range from about 10 to about 30% by weight. Moreover, the catalyst system is ideally used in the form of a fixed bed.

In accordance with the another aspect of the invention, a method is provided for preparing a catalyst system for heterogeneous catalysis of an organic compound conversion reaction. This method comprises reacting (i) a $BF_3$/alcohol catalyst complex and (ii) an activated metal oxide support for said catalyst complex. The reaction product includes an amount of the catalyst complex effective for catalyzing conversion reactions.

Desirably the alcohol has no alpha hydrogen. Even more desirably, the alcohol may be methanol.

Preferably the concentration of the catalyst complex on the alumina may range from about 10 to about 30% by weight.

In a preferred form of the invention, the conversion reaction may comprise the polymerization of isobutylene to form a polyisobutylene product, the activated metal oxide support may comprise gamma alumina, and the ratio of alcohol to $BF_3$ in the catalyst complex may range from about 0.5 mole of alcohol per mole of $BF_3$ to about 2 moles of alcohol per mole of $BF_3$.

In a highly preferred form of the invention, a method is provided for preparing a catalyst system for heterogeneous catalysis of an isobutylene polymerization reaction. In accordance with this highly preferred form of the invention, the method comprises reacting (i) a $BF_3$/methanol catalyst complex and (ii) a gamma alumina support for said catalyst complex. Ideally the ratio of alcohol to $BF_3$ in the catalyst complex may range from about 0.5 mole of alcohol per mole of $BF_3$ to about 2 moles of alcohol per mole of $BF_3$, and the concentration of the catalyst complex on the alumina may range from about 10 to about 30% by weight.

The invention also provides a method for conducting an organic compound conversion reaction wherein a selected reactive organic compound is contacted with a catalyst system as set above. In particular, the invention provides a method for conducting an isobutylene polymerization reaction which comprises contacting isobutylene with a catalyst system that comprises a reaction product of (i) a $BF_3$/methanol catalyst complex and (ii) a gamma alumina support for said catalyst complex In this highly preferred form of the invention, the ratio of alcohol to $BF_3$ in the catalyst complex may range from about 0.5 mole of alcohol per mole of $BF_3$ to about 2 moles of alcohol per mole of $BF_3$, and the concentration of the catalyst complex on the alumina may range from about 10 to about 30% by weight. Moreover, the catalyst system is ideally used in the form of a fixed bed.

DETAILED DESCRIPTION OF THE INVENTION

The object of the invention is to provide an activated metal oxide catalyst composition or system that may be used in a wide range of organic compound conversion reactions requiring an acid catalyst. Organic conversion reactions may include, but are not limited to, Friedel-Crafts alkylation, phenolic alkylation, olefin dimerization and oligomerization, olefin polymerization, propylene oligomerization and polymerization, butylenes and isobutylene dimerization and oligomerization, butylenes and isobutylene polymerization, isoparaffin alkylation and the like.

A preferred embodiment of this invention is to provide a heterogeneous catalyst composition or system for the dimerization and oligomerization of higher alpha-olefins in the range of $C_5$-$C_{12}$. Such products may be useful as synthetic lubricant intermediates, particularly for the manufacture of polyalphaolefins (PAO) based on dimerization and oligomerization of $C_{10}$-$C_{12}$ alpha-olefins.

A particularly preferred embodiment of the invention is to provide an efficient, heterogeneous catalyst system for the polymerization of isobutylene to produce highly reactive polyisobutylene.

Activated metal oxide catalysts of the invention of the present application are prepared by reacting normally liquid $BF_3$/alcohol complexes with anhydrous crystalline aluminum oxide (alumina). Gamma and theta alumina are the preferred crystalline structures.

$BF_3$-alumina compositions of the prior art either are not catalytic for some organic conversion reactions, as reported in U.S. Pat. No. 6,710,140. Moreover, in some cases at $BF_3$ levels that might be catalytic, the $BF_3$ leaches off and requires additional $BF_3$ to be added along with the reactant feed. This, of course, defeats the purpose of a solid heterogeneous catalyst since post treatment of the reactor effluent is required to remove the $BF_3$ residues.

In accordance with the invention of the present application, it has been unexpectedly found that if normally liquid $BF_3$/alcohol complexes are used instead of $BF_3$ gas, the resulting reaction products with crystalline alumina are highly catalytic, are stable, have a long life, are not deactivated or consumed during the catalytic process. Moreover, high loadings of $BF_3$ may be achieved without the problem of $BF_3$ leaching into the reaction mixture.

Suitable crystalline alumina types include theta alumina and gamma alumina. The more preferred crystal structure is gamma alumina because it has a higher capacity for $BF_3$/alcohol catalyst complexes than does theta alumina. Alpha alumina is least preferred.

The alumina must be essentially dry before reaction with the $BF_3$/alcohol complex. This may be accomplished by heating the same at 200° C. for 10-20 hours.

The $BF_3$/alcohol complex may be formed by passing $BF_3$ gas through a solution of pure anhydrous alcohol at a rate that allows the $BF_3$ to be efficiently absorbed. The ratio of alcohol to $BF_3$ may generally range from about 0.5 moles of alcohol per mole of $BF_3$ to about 2 moles of alcohol per mole of $BF_3$. A more preferred range is from about 1 mole of alcohol per mole of $BF_3$ to about 2 moles of alcohol per mole of $BF_3$. The most preferred range is from about 1 mole of alcohol per mole of $BF_3$ to about 1.3 moles of alcohol per mole of $BF_3$.

Alcohols in the range of $C_1$-$C_{10}$, with no alpha hydrogens, are suitable for complexing with $BF_3$. Alcohols that have alpha hydrogens are easily dehydrated by $BF_3$ to form olefins. Even if $BF_3$/alcohol complexes may be formed at low temperatures, for example, the resulting complexes are not stable at reaction temperatures. The more preferred alcohols are methanol and neo-alcohols, such as neopentyl alcohol. The most preferred alcohol is methanol.

Glycols and polyhydric alcohols with no alpha hydrogens may also be used; for example ethylene glycol.

The reaction of the $BF_3$/alcohol complex with alumina is highly exothermic and must be controlled to avoid loss of $BF_3$. The $BF_3$/alcohol complex may be added by any mechanical means that allows good mixing of the complex with the alumina and that also allows for adequate temperature control. A preferred method is to add the alumina to a rotating double cone mixer and meter in the $BF_3$/alcohol complex such that the temperature is controlled within the desired range. The temperature during the mixing should not exceed 50-60° C.

The concentration of $BF_3$/alcohol complex on the alumina may range from about 10 to about 30% by weight. A preferred range is from about 20 to about 30% by weight. The most preferred range is from about 25 to 30% by weight. The actual concentration of F or B in the $BF_3$/alcohol complex-alumina system depends on the alcohol used.

The final catalyst composition (system), which is a $BF_3$/alcohol-alumina reaction product, may be used to catalyze organic compound conversion reactions. The catalyst composition may be contacted with the reactants in a batch or a continuous processes.

In a preferred embodiment of the invention, the reactor may be a shell in tube heat exchanger in which the catalyst composition is packed in the tubes. Such an arrangement may be referred to as a fixed bed reactor. This is especially suitable for highly exothermic reactions such as olefin polymerization, particularly isobutylene polymerization.

The exchanger may be situated vertically. The heat exchange media may be circulated through the shell side of the exchanger. The exchanger may be either a single or multiple pass type. A two pass exchanger is particularly desirable. The exchanger may be fitted with a recirculation loop to accommodate a volumetric recirculation flow. The olefin-containing feed stock may enter the reactor via a recirculation pump at a location downstream from the pump. The recirculation pump pushes the olefin stream through the reactor tubes and returns the stream to the suction side of the pump. In the case of the two-pass heat exchanger, the recirculation flow may enter through the bottom of the reactor, then pass through the tubes, exit the reactor from the bottom and return to the pump. This flow scheme constitutes what is generally considered a loop reactor. The pump speed, or an internal recirculation loop on the pump itself, is used to control the flow rate. The flow rate preferably may be sufficient to generate a velocity that causes turbulent, or at least non-laminar flow of the olefin feed stream over the fixed bed catalyst composition packed in the tubes.

A volumetric feedstock flow may enter the recirculation loop via a feed pump at a location between the outlet of the recirculation pump and the bottom of the reactor at the beginning of the first pass. At equilibrium, the concentrations of the olefin monomer and the polymer products is constant throughout the reactor so the point at which the reaction effluent leaves the reactor is a matter of choice. However, it may be convenient for the effluent line to be located at the top of the reactor after the first pass. The effluent flow rate is necessarily equal to the volumetric feedstock flow rate. The volumetric feedstock flow rate is independent of the volumetric recirculation flow rate and desirably may be adjusted so as to achieve a desired residence time and conversion.

The reactor may be fitted with appropriate temperature, pressure and flow indicators and controllers necessary to operate under controlled conditions.

The size of the heat exchanger reactor is arbitrary and is based on the desired volume of product. A convenient size is 10-15 feet in length and 4-6 feet in diameter. The number of tubes in the reactor and the diameter of the tubes depend on the catalyst type, size and shape and on the desired output. A convenient number of tubes, for the above reactor size, is 150-200 tubes per pass, with an internal diameter of ½ to 1 inch. In a two pass exchanger, the tubes extend the full length of the reactor vertically and are connected by end caps at the top and bottom of the reactor. The olefin reaction mixture is directed into one side of the bottom end cap and is returned through the other side of the bottom end cap. The interior of the top end cap is open with a outlet for the reaction effluent.

In a preferred embodiment, the reactor pressure may preferably be at least 150 psig or least at a sufficient level to ensure that a liquid phase is maintained in the reactor. The pressure may be controlled by means of a back pressure regulator on the reactor effluent line.

The reactor may desirably be operated at temperatures and conditions to produce polymer products in the molecular weight range, in the case of polyisobutylene, of about 300 to about 5,000 Daltons Other temperatures and conditions may be used as required for specific organic conversion reactions.

The volumetric recirculation flow rate may be adjusted to provide a heat transfer coefficient of about 40-60 BTU/min-$ft^2$-° F. The volumetric feedstock flow rate may be maintained at rate to give a Liquid Hour Space Velocity (LHSV) of 1-30 kg isobutylene/kg catalyst. More preferably, the LHSV may be controlled at from about 3-10 kg isobutylene/kg catalyst.

A preferred olefin feedstock is $C_4$ raffinate, also known as raffinate-1 or raff-1. The actual composition of such a stream is variable depending on the source, but a typical raff-1 stream might contain about 0.5 wt % $C_3$, about 4.5 wt % isobutane, about 16.5 wt % n-butane, about 38.5 wt % 1-butene, about 28.3 wt % isobutylene, about 10.2 wt % cis- and trans-2-butene and less than 0.5 wt % butadiene and less than 1.0 wt % oxygenates. The presence of oxygenates may or may not affect the catalytic reaction. The $C_3$s and the n-butane are inert and pass through the reactor unchanged and are removed from the reaction mixture in the downstream stripping steps. The isobutylene reacts to a high degree depending on the reaction conditions and the desired final product. The 1- and 2-butenes may react to varying degrees depending on the catalyst type and reactor conditions. The unreacted olefins are also removed from the polymer product in the downstream stripping steps. Raff-1 feed stocks are particularly preferred for production of polymers in which high reactivity is not important. These products are referred to as conventional PIB or PB.

Another preferred olefin feedstock is the effluent from the dehydrogenation of isobutane to isobutylene, referred to simply as dehydro effluent, or DHE. DHE typically contains about 42-45 wt % isobutene, and about 50-52 wt % isobutane with the balance being small amounts of $C_3$, normal butanes and butylenes, and butadiene. This feedstock is particularly suitable for production of polyisobutylene in locations in Table I below shows a comparison between prior and current commercial processes for making polyisobutylene and the process of the invention of the present application employing the novel $BF_3$/alcohol-metal oxide catalyst system of the invention. In the Table 1, the column labeled "Soltex" refers to the invention of the present application. In addition, the term IB refers to isobutylene.

TABLE 1

COMPARISON OF PIB PROCESS TERMINOLOGY

| Component | Conventional | BASF/Oronite | TPC | Soltex |
|---|---|---|---|---|
| Reactor | Large, high volume, fluidized bed, 2,000-4,000 gal | Large, high volume CSTR, 2,000-4,000 gal | Low volume tubular loop reactor, 30-50 gal | Low volume fixed bed loop reactor, 50-100 gal |
| LHSV (bed wt per hr) | 1-2 | 1-2 | 5-10 | 5-10 |
| Catalyst | Solid AlCl3 slurry | BF3 gas mixed in-situ with modifier, Premixed catalyst not stable | Premixed BF3-methanol co-fed with feed. Control issues. Catalyst is stable, no BF3 gas | Solid catalyst packed in tubes of reactor. No need to co-feed with IB. Simplifies operating scheme |
| Feed | Raff-1 | High purity IB diluted with hexane | IB concentrate, 80-90% | High purity IB, no dilution |
| Cat Removal | Filtration/water wash. Neutralization of Al salts | Quench w/base followed by series of water washes | Quench w/NH4OH, followed by two mixer/settler water washes. Requires Neutralization of NH4OH | None |
| Waste | Al salts | BF3 aqueous salts | BF3 aqueous salts | None |
| High Reactive | No | Yes | Yes | Yes |
| C4 removal | C4 flasher at 50-90 psig | C4 flasher at 50-90 psig | C4 flasher at 50-90 psig | C4 flasher at 50-90 psig |
| Light Polymer Removal | Atm stripper, vacuum distillation | Atm stripper, vacuum distillation | Atm stripper, vacuum distillation | Atm stripper, vacuum distillation | which the inert isobutane may be utilized, for example in cooperation with an isobutane dehydrogenation unit.

Another preferred olefin feedstock is DHE in which most of the inert isobutane has already been removed. This stream is known as Isobutylene Concentrate and typically contains about 88-90 wt % isobutene, and about 5-10 wt % isobutane, with the balance being minor amounts of $C_3$, normal butanes and butylenes, and butadiene. This feedstock is also suitable for production of highly reactive polyisobutylene.

Yet another preferred olefin feedstock is high purity isobutylene which contains greater than 99 wt % isobutylene. This feedstock is highly suitable for the production of highly reactive polyisobutylene. Unreacted olefin may be easily recycled.

After leaving the reactor, the reaction effluent may be purified simply by atmospheric and/or vacuum stripping to remove light byproducts and inerts. The unreacted monomers maybe be recycled, but provisions must be made to separate or purge the inerts depending on the olefin feed type.

Because the reaction scheme discussed above allows for a very efficient removal of the heat of reaction such that isothermal and CSTR (Continuous Stirred Tank Reactor) conditions may be maintained, the volumetric efficiency is very high. That is, a large volume of product may be produced for a given reactor volume. Therefore the capital cost per volume of product is very low. The fact that downstream catalyst removal and/or catalyst regeneration equipment is not required further impacts the total capital cost in a positive manner.

The above description of an isobutylene polymerization process has been used to illustrate the utility of the activated metal oxide catalyst system of the invention of the present application. Such description of a preferred embodiment was not meant to limit the scope of the invention. The $BF_3$/alcohol-metal oxide reaction product of the invention may be used as a catalyst in connection with any organic product reaction that requires an acid catalyst. These reactions include, but are not limited to, Friedel-Crafts alkylation, phenolic alkylation, isoparaffin alkylation, olefin dimerization and polymerization in general, higher alpha olefin dimerization and isobutylene dimerization among others.

The foregoing disclosure and description of the invention is illustrative and explanatory thereof. Various changes in the details of the described method may be made without departing from the true spirit of the invention.

I claim:

1. A catalyst system for heterogeneous catalysis of an isobutylene polymerization reaction to form a polyisobutylene product, the catalyst system comprising a reaction product of (i) a $BF_3$/alcohol catalyst complex in which the alcohol has no alpha hydrogen with (ii) an alumina support for said catalyst complex, a concentration of said catalyst complex on said alumina support ranges between 10 to 30% by weight, a ratio of the alcohol to the $BF_3$ in said catalyst complex ranges between 0.5 mole of the alcohol per mole of $BF_3$ to 2 moles of the alcohol per mole of $BF_3$, said alumina support consisting essentially of alumina.

2. The catalyst system of claim 1, wherein the isobutylene polymerization reaction comprises Friedel-Crafts alkylation, phenolic alkylation, olefin dimerization, olefin oligomerization, olefin polymerization, propylene oligomerization, propylene polymerization, butylene dimerization, butylene oligomerization, isobutylene dimerization, isobutylene oligomerization, butylene polymerization, isobutylene polymerization or isoparaffin alkylation.

3. The catalyst system of claim 1, wherein the concentration of said catalyst complex on the alumina ranges from about 25 to about 30% by weight.

4. The catalyst system of claim 1, wherein the catalyst system is a fixed bed.

5. The catalyst system of claim 1, wherein alumina support consists essentially of gamma alumina.

6. The catalyst system of claim 1, wherein the ratio of alcohol to $BF_3$ in the catalyst complex ranges from about 1 mole of alcohol per mole of $BF_3$ to 1.3 moles of alcohol per mole of $BF_3$.

7. A method for preparing a catalyst system for heterogeneous catalysis of an isobutylene polymerization reaction to form polyisobutylene, the method comprising reacting (i) a $BF_3$/alcohol catalyst complex in which the alcohol has no alpha hydrogen with (ii) an alumina support for said catalyst complex, wherein a concentration of said catalyst complex on said alumina support ranges between 10 to 30% by weight, and wherein a ratio of the alcohol to the $BF_3$ in said catalyst complex ranges between 0.5 mole of the alcohol per mole of $BF_3$ to 2 moles of the alcohol per mole of $BF_3$, said alumina support consisting essentially of alumina.

8. The method of claim 7, wherein said alumina support consists essentially of gamma alumina.

\* \* \* \* \*